July 14, 1964 J. F. CHANDLER 3,141,109

COLOR TELEVISION CONVERGENCE CIRCUIT

Filed Oct. 4, 1960 2 Sheets-Sheet 1

INVENTOR.
James F. Chandler
BY
Hugh H. Drake
Atty.

July 14, 1964 J. F. CHANDLER 3,141,109
COLOR TELEVISION CONVERGENCE CIRCUIT
Filed Oct. 4, 1960 2 Sheets-Sheet 2
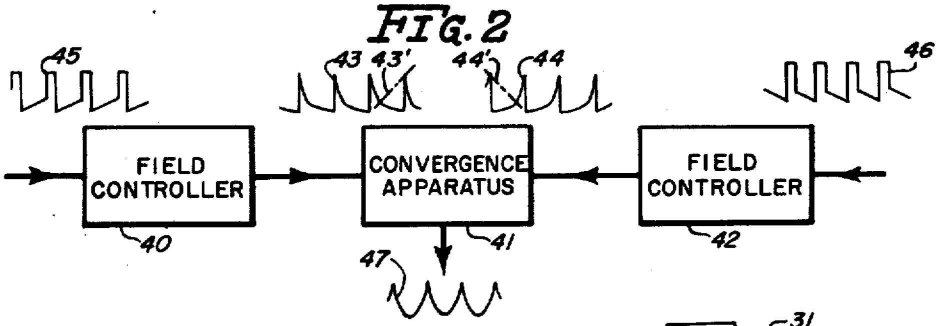
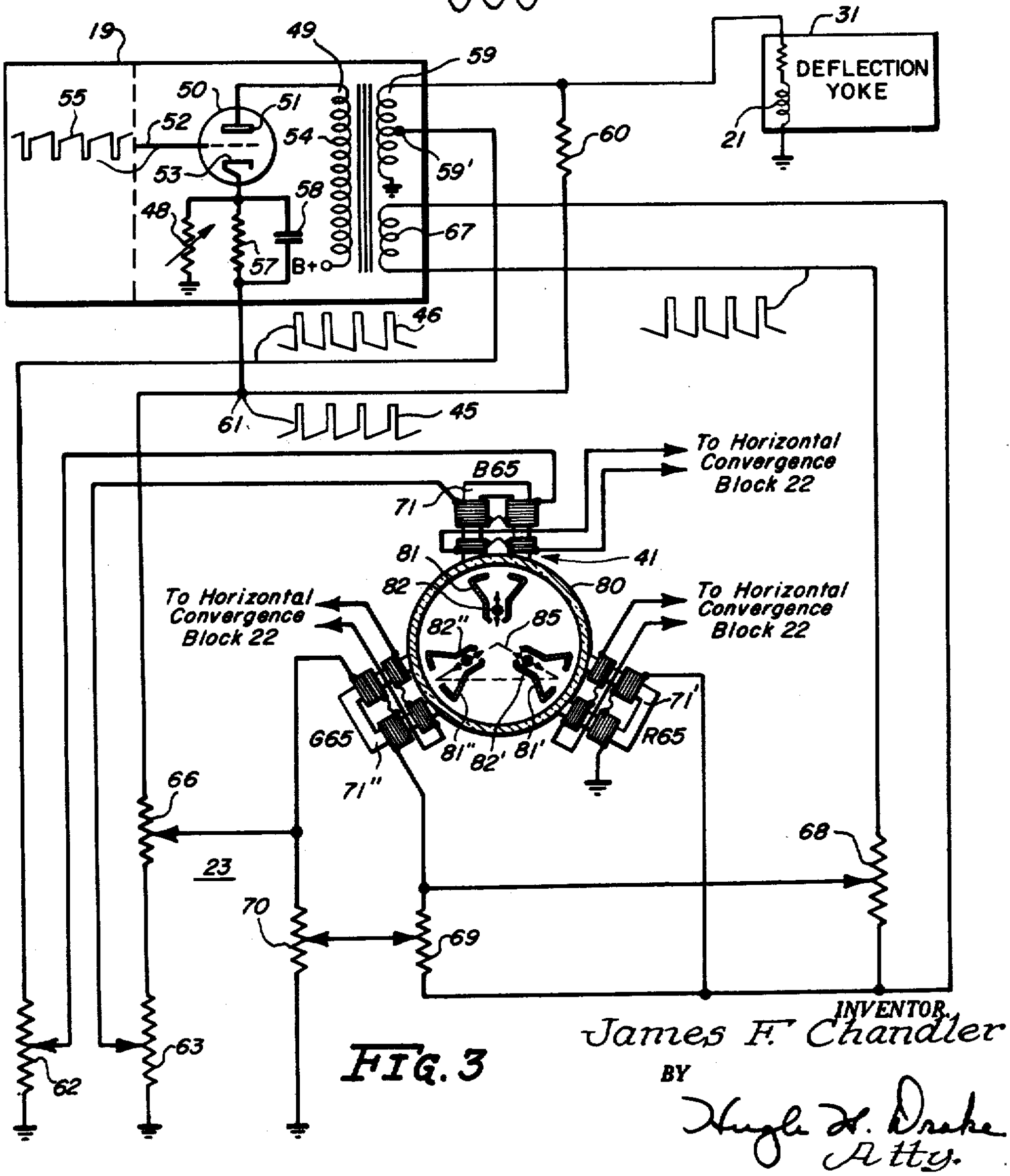
FIG. 2
FIG. 3
INVENTOR.
James F. Chandler
BY
Hugh H. Drake
Atty.

United States Patent Office 3,141,109
Patented July 14, 1964

3,141,109
COLOR TELEVISION CONVERGENCE CIRCUIT

James F. Chandler, Chicago, Ill., assignor to Zenith Radio Corporation, a corporation of Delaware Filed Oct. 4, 1960, Ser. No. 60,413
12 Claims. (Cl. 315—22)

The present invention relates to color television. More particularly, it pertains to a dynamic electron beam convergence circuit especially suitable for use in a color television receiver.

Present day multi-beam cathode-ray tubes require that the electron beams be converged in a surface throughout the scanning period. In a conventional shadow-mask cathode-ray tube this surface corresponds, at least approximately, with the screen. In this type of tube, the beams are projected from a plurality of transversely spaced locations, and the geometry of the tube is such that the beams do not naturally converge at all points in the screen surface traversed during the entire scanning period. It is known to achieve convergence by subjecting the beams to auxiliary electrostatic or magnetic fields. These fields influence the direction of the beam travel so as to converge them at all points in the aforementioned surface.

When an electrostatic convergence field is used, electrodes are located within the tube and energized properly to direct the various beams; the potential of the field is time-varied as a function of deflection angle. Electromagnetic convergence fields are more commonly employed, and they likewise vary in strength as a function of the deflection angle. In the latter convergence system, ferromagnetic pole pieces conventionally are disposed internal to the cathode-ray tube neck and form channels through which the beams are directed by the electron guns. External to the tube neck, U-shaped electromagnets are held in a position to pass flux through the envelope to and across the internal pole pieces to control the direction of beam travel.

Due to the physical construction of the conventional shadow-mask tube, it has been found that the field should vary in magnitude as a parabolic function of deflection. It is also generally known that this parabolic function may be approximated, while maintaining adequate overall convergence, if proper segments of sinusoidal waves or waves representing certain exponential functions are used. Such waves may be obtained from the receiver in a variety of ways. One practical way is to employ energy derived from the horizontal and vertical deflection circuits. These circuits usually develop a pulse-sawtooth voltage wave and it is known that a parabolic voltage or current wave component may be derived therefrom. It is this parabolic component which is used to develop the convergence field, and its magnitude determines the positioning of the beams.

Conventional convergence circuits do not permit independent convergence adjustment of the beams at discrete portions of the raster. As a result, it is difficult and tedious to achieve dynamic convergence of the beam at all points throughout the raster.

It is accordingly an object of this invention to provide independent electron beam convergence adjustment for different portions of a raster.

It is another object of this invention to provide a new dynamic convergence circuit which permits simple and systematic adjustment of dynamic convergence.

It is a further object of this invention to provide a dynamic convergence circuit which utilizes a minimum number of components.

In accordance with this invention a color television receiver comprises a color image reproducer of the type in which a luminescent screen is scanned by a plurality of electron beams effectively originating from a corresponding plurality of transversely spaced locations and means for subjecting at least one of the electron beams to a beam-directing field varying in magnitude with respect to time as a parabolic function composed of superimposed portions of a pair of parabolas having their principal axes canted with respect to one another. The field converges the beams ideally in the surface of the screen or more practically, in a surface having a predetermined location relative to that of the screen.

The features of the present invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements, and in which:

FIGURE 2 is a simplified block diagram of a portion of the receiver and also displays waveshapes developed by different parts thereof; and FIGURE 3 is a schematic diagram of a preferred embodiment of the apparatus including that represented in FIGURE 2.

Figure 1:
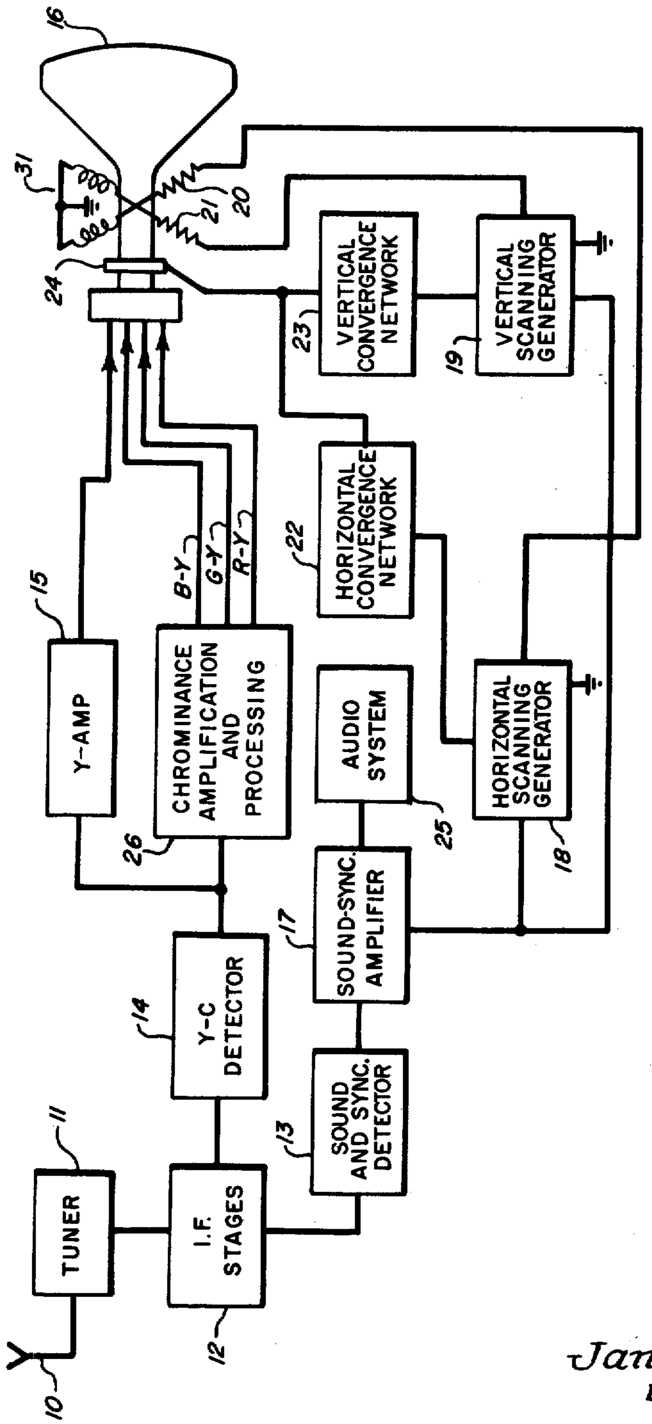
FIGURE 1 is a block diagram of a color television receiver incorporating the invention.

In the color television receiver shown in FIGURE 1, composite color television signals received by antenna 10 are applied to the input circuit of a tuner 11. Tuner 11 comprises one or more stages of radio-frequency amplification and a converter or first detector. Intermediate-frequency composite color television signals developed by tuner 11 are applied to an intermediate-frequency (I.F.) amplifier 12 of any desired number of stages. The amplified intermediate-frequency signal from I.F. amplifier 12 is concurrently applied to a pair of detectors 13 and 14, one for deriving the sound signal components and the other for deriving the brightness (Y) and chrominance (C) signal components. The sound detector 13 is also used to derive synchronizing (sync) information as is conventional; however, it is known to utilize either detector for obtaining synchronizing information.

The detected brightness signal, commonly designated the Y signal, is applied from detector 14 to a Y amplifier 15 of any desired number of stages and the amplified brightness signal is impressed on the cathodes of each of the three electron guns of a conventional three-beam tri-color kinescope 16.

The sound and sync signals from sound detector 13 are amplified in a sound-sync amplifier 17 of one or more stages which includes a synchronizing-signal separator. The amplified and separated sync signal is then concurrently applied to both horizontal scanning signal generator 18 and vertical scanning signal generator 19. Horizontal scanning generator 18 includes a line-frequency oscillator, and a phase detector and frequency control stage to provide automatic control of the oscillator frequency. Vertical scanning generator 19 employs a field scanning signal developer or driver and one or more stages of amplification. Scanning signal generators 18 and 19 are coupled to respective line-frequency and field-frequency magnetic deflection elements or coils 20 and 21 which form a yoke 31. As schematically represented, coils 20 and 21 each effectively constitute an inductance and a resistance in series.

Energy derived from the horizontal scanning generator 18 and the vertical scanning generator 19 is fed respectively to a horizontal convergence network 22 and a vertical convergence network 23. Vertical convergence network 23 develops appropriate dynamic convergence signals which are applied to a convergence yoke 24 associated with tri-color kinescope 16. Horizontal convergence network 22 develops similar signals which also are applied to yoke 24. The convergence circuitry will be discussed in more detail presently.

An automatic gain control potential is also developed in the synchronizing-signal separator of the sound-sync amplifier 17 for application to tuner 11 or I.F. amplifier 12 as well understood in the art. Intercarrier sound signals derived from the output circuits of the sound-sync amplifier 17 are applied to a conventional audio system 25 which comprises a limiter, a discriminator, an audio amplifier of any desired number of stages and a loudspeaker or other sound reproducing device.

Detected video signals from Y–C detector 14 are applied to suitable chrominance amplification and processing circuits 26 which are of entirely conventional construction. As is typical, these circuits include one or more stages of chrominance amplification, a color burst amplifier and separator, a color reference oscillator with an associated automatic frequency control circuit, a color killer and a pair of synchronous demodulators for developing three color difference signals $R-Y$, $G-Y$ and $B-Y$ corresponding to the chrominance information associated with the three primary colors, red, green and blue. The color defference signals developed by circuits 26 are applied respectively to the control grids of the thre electron guns of kinescope 16. If desired, chrominance amplification and processing circuits 26 may also comprise appropriate automatic chrominance control circuits and, of course, appropriate controls for adjusting hue and saturation of the reproduced image.

The invention as illustrated in detail in FIGURE 3 is embodied in connection with vertical convergence network 23. Referring to FIGURE 2, however, convergence apparatus 41 is representative of that employed in either the vertical or the horizontal convergence networks 22 or 23 since the invention is applicable to both. Thus, first and second field controllers 40, 42, which control the field developed in convergence apparatus 41, may be associated with either the horizontal or vertical scanning systems. In an electrostatic convergence system, apparatus 41 comprises deflection electrodes in conjunction with a wave-shaping circuit and in an electromagnetic system it takes the form of polepieces in conjunction with convergence coils.

As stated previously, the desired parabolic convergence field variation may be approximated by a variation corresponding to a segment of a sine wave, to certain exponential functions which resemble parabolic functions or to a combination of both. Thus, the terms parabolic and segmental-parabolic are employed herein to mean any such approximation as well as a true parabolic function.

Field controller 40 develops in convergence apparatus 41 a field component having a waveshape 43 a portion of which is a segment of a parabola. Field controller 42 develops in apparatus 41 a field component having a waveshape 44 a portion of which is a segment of another parabola. As indicated in FIGURE 2, the segmental-parabolic components developed in apparatus 41 by controllers 40 and 42 are oppositely asymmetrical with respect to each other in that the axis of symmetry 43' of the parabola from which one segment is taken is canted or tilted with respect to the axis of symmetry 44' of the parabola from which the other segment is derived. Thus, components themselves may be derived from energy varying with a symmetrical parabolic waveform. The component developed by controller 40 is selected so that its higher rate of magnitude change occurs during the time period corresponding to the first half of the scanning interval. In contrast, the component developed by controller 42 varies little in magnitude during the time-period corresponding to the first half of the scanning interval and undergoes its highest rate of magnitude change during the time-period corresponding to the second half of the scanning interval. Thus, the components are oppositely asymmetrical.

These two segmental-parabolic field components are combined or superimposed in apparatus 41 to create a resultant field the intensity variation of which is generally of parabolic form. However, the field intensities during the two different parts of the scanning period are adjustable independently of one another. These adjustments are substantially independent because the steep portions of the waveforms are time-displaced and only the flatter portions overlap the steep portions. In consequence, substantially independent convergence control in opposite portions of the raster is achieved.

Curves 45 and 46 represent the waveforms of source signals preferably generated by controllers 40 and 42 to produce the parabolic field components developed in apparatus 41 when the latter includes integrating means such as a convergence coil for developing field flux or an inductor for developing a field potential. The energy waveform 45 at the output of controller 40 is a pulse sawtooth in which the sawtooth portion has a slope conventionally denoted as going in an upward or positive direction and is followed by a positive going pulse. On the other hand, the energy waveform 46 at the output of controller 42 is a sawtooth of a negative slope while the intervening pulse is positive going. The positive pulses occur coincidentally in time, once during each scanning interval. The remaining sawtooth portions have slopes of opposite polarity as a result of which the respective segmental-parabolic components developed in apparatus 41 combine to form a field having a waveform 47. The latter includes one substantially complete parabola for each scanning interval. The relative magnitudes of the previously mentioned positive pulses will determine the axis of symmetry of this parabola. The sawtooth slopes should be in opposite directions to insure that the controllers develop segmental-parabolic components of proper orientations.

In its preferred form, the invention is practiced with the circuitry of FIGURE 3. In FIGURE 3, the potentiometer networks of convergence network 23 are depicted in detail as are the components of convergence yoke 24. Forming a portion of vertical scanning signal generator 19 is a triode 50 having a plate 51, a grid 52 and a cathode 53. Grid 52 receives its input signal from the conventional driver portion of generator 19 which develops a pulse sawtooth voltage wave 55. A parallel combination of a resistor 57 and a capacitor 58 is connected between the cathode 53 and a point 61. A variable resistor 48 is connected between the cathode and ground to provide input bias. The plate circuit of triode 50 includes the primary winding 54 of a vertical output transformer 49 and a conventional power source B+. A secondary winding 59 on transformer 49 is coupled across vertical deflection coil 21, one end of which is grounded. A resistor 60 is connected from point 61 to the ungrounded end of coil 21 across which conveniently appears a positive vertical pulse; however, this pulse might be obtained instead from a tap on transformer winding 59 or from a separate winding on the transformer.

A tap 59' on winding 59 is connected to one end of a potentiometer 62 the other end of which is grounded. The arm or wiper of potentiometer 62 is connected to one end of a two-winding convergence coil B65. The remaining end of coil B65 is connected to the wiper of potentiometer 63 which has its two ends connected between ground and one end of a potentiometer 66. The remaining end of potentiometer 66 is returned to point 61. The wiper of potentiometer 66 is connected both to one end of a convergence coil G65 and to one end of potentiometer 70, the remaining end of which is returned to ground. The opposite end of the two winding convergence coil G65 is connected both to the wiper of a potentiometer 68 and to one end of potentiometer 69.

The wipers of potentiometers 70 and 69 are coupled together. The remaining end of potentiometer 69 is connected to one end of a two winding convergence coil R65, to one end of the potentiometer 68, and to one end of tertiary winding 67 on transformer 49. The remaining end of tertiary winding 67 is connected to the remaining end of potentiometer 68. The remaining end of coil R65 is connected to ground. Coils B65, R65 and G65 are wound around the legs of U-shaped ferromagnetic cores 71, 71' and 71'' located external to the neck 80 of cathode-ray tube 16.

Also depicted in FIGURE 3 are associated pairs of horizontal convergence coils connected to horizontal convergence network 22. The convergence coils and ferromagnetic cores form a part of yoke 24. Within neck 80 of kinescope 16 are pairs of circularly spaced internal pole pieces 81, 81' and 81''. The pole pieces together with the associated coils and cores constitute convergence apparatus 41; potentiometers 62 and 68 each constitute an embodiment of controller 42 and potentiometers 63 and 66 each an embodiment of controller 40. Cores 71, 71' and 71'' are positioned to pass flux through neck 80 to pole pieces 81, 81' and 81''. These pole pieces are aligned with respect to the electron guns so that the electron beams passed through the respective gaps provided by the pole piece pairs. The beams are designated 82, 82' and 82'' and are conventionally referred to as the blue, red and green beams, respectively. The beams move transversely to the flux created within the gaps and such movement is indicated in FIGURE 3 by arrows. As illustrated, the blue beam 82 moves vertically whereas the red and green beams 82', 82'' move along the radial lines with respect to the tube or, for purposes of discussion, along the legs of an imaginary triangle 85.

The circuit operation may be more readily understood by first considering only the convergence field produced by coil B65. A signal having a sawtooth waveshape of current is obtained from the cathode current of tube 51, part of which flows through capacitor 58, and potentiometers 66 and 63 to ground. A second signal having a pulse sawtooth voltage waveshape is developed across the secondary winding 59 of transformer 49; the current flowing through resistor 60 and potentiometers 66 and 63 to ground has a pulse sawtooth waveshape. The signal derived from the cathode circuit is a sawtooth of comparatively large amplitude with a positive slope. The sawtooth portion of the pulse sawtooth obtained from the transformer is of comparatively smaller amplitude and has a negative slope. The two currents flowing through the potentiometers 66 and 63 produce a pulse sawtooth waveshape 45 at point 61, the sawtooth being of positive slope and the pulse rising positively. A small portion of the direct current component of the cathode current of tube 51 is fed through resistor 57 into potentiometers 66 and 63 to maintain constant flux in coils B65, R65 and G65 at the center of the scanning interval in conventional fashion.

The voltage between tap 59' of winding 59 and ground has a waveshape 46 including positive going pulses but with a sawtooth portion of the opposite slope as the sawtooth portion of the current waveshape at point 61. This voltage developed at tap 59' is applied across potentiometer 62.

Coil B65 is connected to the wiper arms of potentiometers 62 and 63. Consequently, the magnitudes of the voltages developed on opposite ends of the coil by the respective currents passed through potentiometers 62 and 63 are independently adjustable. The current amplitudes produced in the coil therefore also are independently varied upon adjustment of the wiper arms of potentiometers 62 and 63. Corresponding to the discussion of FIGURE 2, the current developed in coil B65 due to the voltage developed across potentiometer 62 has a waveshape 44 which is an asymmetrical segment of a parabola, the first portion of which remains substantially constant in magnitude and the second portion of which varies greatly in magnitude. On the other hand, the current developed in coil B65, as a result of the voltage across potentiometer 63, has a waveshape 43 which is a parabolic segment of a similar parabola. This segment is asymmetrically opposite the other in that the axis of symmetry 43' of the parabola from which this segment is derived is canted or tilted with respect to the axis of symmetry 44' of the parabola from which the other portion is derived and has a magnitude which varies greatly throughout its first portion but very little throughout its second portion.

Because the sawtooth current waveshape obtained from the cathode circuit usually is not a pure sawtooth wave, the voltage developed across 63 also is not a pure pulse sawtooth and, as a result, the waveshape of current produced in coil B65 approximates a parabola for the first portion and remains essentially flat or constant during the second portion. When the other segmental-parabolic portion is oppositely asymmetrical to the first, the two components are juxtaposed to form substantially one parabolic resultant.

The flux produced in the pole pieces is substantially directly proportional to the current developed in the convergence coils. Thus, by varying the wiper arm positioned on potentiometer 63 the amount of convergence deflection obtained during the first or top half of the raster can be adjusted independently with respect to the bottom half of the picture. Similarly, the current developed in coil B65 by the voltage developed across potentiometer 62 may be independently adjusted to affect substantially only the second half of the deflection period or the bottom of the raster. As a result, the direction of blue beam 82 associated with coil B65 may be adjusted independently over the different raster portions.

Similar circuitry could also be used for the control of the red and green beams 82' and 82''. However, since the movements of these beams have both vertical and horizontal components a slightly different control arrangement is desirable for greater ease of adjustment.

To this end, convergence control of the red and green beams 82', 82'' is, in effect, interrelated. However, the two beams are still independently directed during the first and second halves of the deflection period. The voltage developed across potentiometer 68 is derived from winding 67 of transformer 49 and applied to one end of each of the windings G65 and R65. Here again, a positive pulse sawtooth voltage like that of curve 46 appears across this potentiometer, the sawtooth portion of which has a negative going slope. Applied to the remaining ends of coils G65 and R65 is a pulse sawtooth like that of curve 45 which appears across potentiometer 66.

The principle of superposition may be used to clarify the explanation of the operation of this portion of the circuit. Hence, convergence action during the first and second halves of the deflection period shall be dealt with separately. Assume that the wipers of potentiometers 70 and 69 are set in the exact center positions. The currents developed in coils G65 and R65, which control convergence during the first portion of the raster, are then proportional to the voltages obtained from potentiometer 66. Potentiometer 68 and winding 67 are in parallel and form a very low impedance when compared to the impedance of coils G65 and R65. As a result, two simple series circuits are formed. Applied to each of these series circuits is half of the voltage developed across potentiometer 70 by the voltage across potentiometer 66. One series circuit comprises half of potentiometer 70 and coil G65. The other series circuit comprises the other half of potentiometer 70 and coil R65 which is returned through ground. The position of the tap on potentiometer 68 is substantially immaterial due to the fact that it is shunted by several low impedance elements. Thus, the current in both coils G65 and R65 varies in proportion to the voltage across potentiometer 66 during the first raster portion. Potentiometer 66 therefore controls the convergence field during the first half of the deflection period. The physical effect is to direct the red and green beams along respective paths which, when viewed transversely to the direction of electron beams travel, resemble the legs of imaginary triangle 85.

To understand the operation of coils G65 and R65 during the second half of the raster, again assume that the wipers of potentiometers 69 and 70 are set in the center. Potentiometer 70 together with potentiometers 66 and 63 in parallel form another low impedance network when compared to the impedance of coils G65 and R65. The voltage developed across potentiometer 69 is split into two parts developing respective currents in the two series circuits of coils G65 and R65. The current amplitudes developed in coils G65 and R65 are proportional to the setting of the wiper on potentiometer 68. As this wiper is varied the currents in the coils are simultaneously varied. Here again the physical effect is to bring the two beams, that is the green and red beams 82'', 82', together and they are directly along respective paths which when viewed transversely to beam travel resemble the legs of the imaginary triangle 85.

To provide additional positioning of the two beams 82', 82'' controls are included to move these beams along the same paths, that is along the respective legs of triangle 85, but in different relative amounts. Potentiometers 69 and 70 are used for this purpose.

The voltage developed across potentiometer 70 when its wiper is centered is applied to coils G65 and R65 in equal proportions. When the wiper is moved off center more voltage is applied across one coil than the other and, as a result, more current flows through the coil which has the higher applied voltage. This moves one beam along one leg of triangle 85 more than the other beam is moved along its respective leg. This movement of the beams is effected during only the first half of the raster and is irrespective of the wiper settings of potentiometers 69 or 68 because their branches offer a low impedance as compared with the impedance of coils G65 and R65. However, the setting of potentiometer 69 does play a predominant role when potentiometer 69 is considered as the voltage source.

Potentiometer 69 develops a voltage which is a portion of the voltage applied across it by potentiometer 68, and when the wiper on potentiometer 69 is centered, the voltage developed across potentiometer 69 is equally divided across coils G65 and R65. However, when the wiper on potentiometer 69 is off-center one coil receives more or less current than the other coil due to the unbalance of voltages applied to the coils. This is irrespective of the position of the wiper on potentiometer 70 since its branch presents a low impedance as compared to that of coils G65 and R65. Thus, when potentiometer 69 is considered as a voltage source and develops a voltage corresponding to the convergence needed during the second half of the picture deflection period, then the position of the wiper of potentiometer 69 plays a predominant role.

To recapitulate, by adjusting potentiometer 66, current in coils G65 and R65 is varied unidirectionally in magnitude as a parabolic function of deflection angle during substantially only the first half of the deflection period. Potentiometer 68 unidirectionally adjusts the amplitude of the current developed in each of the coils G65 and R65. This controls convergence during substantially only the second half of the deflection period. The position of the wiper of potentiometer 70 inversely varies the current magnitudes developed in coils G65 and R65 during substantially the first half of the deflection period, while the current magnitudes developed are varied inversely by the wiper of potentiometer 69 during substantially only the second half of the deflection period.

As explained, potentiometers 70 and 69 vary the coil current magnitudes during their respective halves of the picture deflection period. As one current is increased by a certain amount in one coil the current is decreased by that same amount in the other coil. It is sometimes desirable to differentially vary the ratio of current developed in the green and red coils; it is evident that a combination of two potentiometers may be used to replace potentiometer 70 and another combination of two potentiometers may be used to replace potentiometer 69. This permits the current to be changed in one coil a certain amount while it is changed in the remaining coil a different amount.

Merely by way of illustration and in no sense by way of limitation the following circuit component values may be employed in the preferred embodiment of FIGURE 3:

| | | |
|---|---|---|
| Potentiometer **62** | ohms | 120 |
| Potentiometer **63** | do | 30 |
| Potentiometer **66** | do | 120 |
| Potentiometer **70** | do | 120 |
| Potentiometer **69** | do | 120 |
| Potentiometer **68** | do | 60 |
| Resistor **60** | do | 180 |
| Winding **67** | turns | 60 |
| Winding **59** | do | 340 |
| Winding **54** | do | 3300 |
| Tap **59**—from ground | do | 30 |

A conventional cross-hatch generator may be used to develop a test signal for use in adjusting a receiver incorporating the invention. The generator feeds a signal to the receiver which causes each of the red, blue and green beams to produce a pattern composed of a plurality of groups of red, blue and green horizontal and vertical lines. These are made to coincide at the center using conventional static convergence adjustments as by utilizing separate permanent magnets or by applying unidirectional energy to the convergence apparatus. Vertical dynamic convergence is obtained when the respective groups of red, blue and green horizontal and vertical lines are superimposed to produce one substantially white line for each group at the top and bottom of the raster pattern. The horizontal dynamic convergence controls are used to superimpose the horizontal and vertical lines displayed, at the left and right edges of the raster pattern. The receiver is perfectly aligned with respect to convergence to reproduce color pictures when all lines generated by the cross-hatch generator are superimposed.

Assuming that a cross-hatch generator is producing red, blue and green groups of intersecting lines with the blue line lying in the center between the remaining two, the physical function of each of the potentiometers in FIGURE 3 will be stated in a convenient adjustment sequence. As mentioned previously, the beams are directed transversely to the flux field. Thus, as indicated in FIGURE 3, the blue beam may be moved only vertically. Due to this limitation, all beams are adjusted with respect to the blue vertical lines of each group.

The aforementioned conventional static convergence adjustment is made initially. This adjustment superimposes all lines at the center of the raster, forming a white area. Adjustment of potentiometer 69 then unites the red and green horizontal lines in the bottom portion of the raster. This in effect constitutes moving the beams different amounts on the legs of triangle 85.

Adjustment of potentiometer 68 unites the red, green and blue vertical lines near the vertical center in the bottom portion of the raster. This in effect constitutes moving the red and green beams equal amounts on the legs of triangle 85 even though they may have started from different positions because of the adjustment of potentiometer 69. This equal movement of both the red and green beams causes them to unite with the center blue beam.

Adjustment of potentiometer 70 unites the red and green horizontal lines in the top portion of the raster. This again in effect constitutes moving the beams different amounts on the legs of triangle 85.

Adjustment of potentiometer 66 unites the red, green and blue vertical lines near the center of the top portion of the raster. The effect is the same as that obtained with the adjustment of potentiometer 68.

Adjustment of potentiometer 62 unites the horizontal blue lines, which may be moved only in the vertical direction, with the previously united red and green lines in the bottom portion of the raster.

Similarly, adjustment of potentiometer 63 unites the horizontal blue lines with the prevoiusly united red and green lines in the top portion of the raster.

With the additional adjustments provided by the horizontal dynamic convergence controls, all three beams are readily converged during both halves of the scanning periods and especially at points along the top and bottom portions of the raster. Thus, the present invention provides a new and improved electron beam dynamic convergence circuit utilizing a minimum number of components which permits simplified and systematic independent adjustment of the convergence characteristics over the first and second portions of the scanning raster.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a color television receiver: a color image reproducer in which a luminescent screen is scanned by a plurality of electron beams effectively originating from a corresponding plurality of transversely spaced locations; and means for subjecting at least one of said electron beams to a beam-directing field varying in magnitude with respect to time as a parabolic function composed of superimposed portions of a pair of parabolas having their principal axes canted with respect to one another to converge said beams in a surface having a predetermined location relative to that of said screen.

2. In a color television receiver: a color image reproducer in which a luminescent screen is scanned by a plurality of electron beams effectively originating from a corresponding plurality of transversely spaced locations; means for subjecting at least one of said electron beams to a beam-directing field varying in magnitude with respect to time as a parabolic function composed of superimposed portions of a pair of parabolas having their principal axes canted with respect to one another to converge said beams in a surface having a predetermined location relative to that of said screen; and means for independently adjusting the amplitude of each of said parabolas.

3. In a color television receiver: a color image reproducer in which a luminescent screen is scanned by a plurality of electron beams effectively originating from a corresponding plurality of transversely spaced locations; and means for subjecting at least one of said electron beams to a beam-directing field varying in magnitude with respect to time as a parabolic function composed of superimposed portions of a pair of parabolas having their principal axes canted with respect to one another, said superimposed portions constituting a segment of a third parabola to converge said beams in a surface having a predetermined location relative to that of said screen.

4. A beam convergence circuit for a multi-beam cathode-ray tube the beams of which are deflected in two scanning directions normal with respect to each other comprising: electron beam convergence means; first means for developing in said electron beam convergence means convergence wave energy varying in magnitude as a first parabolic function of deflection angle during the entire deflection period corresponding to one of said directions; and second means for developing in said electron beam convergence means convergence wave energy varying in magnitude as a second parabolic function of deflection angle also during said entire deflection period.

5. A beam convergence circuit for a multi-beam cathode-ray tube the beams of which are deflected in two scanning directions normal with respect to each other comprising: electron beam convergence means; means for developing convergence wave energy derived from energy having a first waveform which comprises a substantially pulse-shaped portion and further comprises a substantially sawtooth-shaped portion; means for developing convergence wave energy derived from energy having a second waveform which comprises a substantially pulse-shaped portion and further comprises a substantially sawtoothed-shaped portion, like portions of said first and second waveforms occurring substantially coincidentally with each other with only one of said like portions being of reverse polarity with respect to the other; and means for coupling said convergence wave energy developing means to said electron beam convergence means.

6. A beam convergence circuit for a multi-beam cathode-ray tube the beams of which are deflected in two scanning directions normal with respect to each other comprising: a first electron beam convergence winding; a second electron beam convergence winding; first means for developing in each of said first and second convergence windings convergence wave energy varying in magnitude as a first parabolic function of deflection angle during the entire deflection period corresponding to one of said directions; and second means for developing in each of said first and second convergence windings wave energy varying in magnitude as a second parabolic function of deflection angle also during said entire deflection period; first means for adjusting the amplitude of said energy developed by said first developing means; and second means for adjusting the amplitude of said energy developed by said second developing means.

7. A beam convergence circuit for a multi-beam cathode-ray tube the beams of which are deflected in two scanning directions normal with respect to each other comprising: a first electron beam convergence winding; a second electron beam convergence winding; first means for developing in said first and second convergence windings convergence wave energy varying in magnitude as a first parabolic function of deflection angle during the entire deflection period corresponding to one of said directions; and second means for developing in said first and second convergence windings wave energy varying in magnitude as a second parabolic function of deflection angle also during said entire deflection period; first means for adjusting the amplitude of said energy developed by said first developing means; and second means for adjusting the amplitude of said energy developed by said second developing means; third means for adjusting the amplitude of said energy developed by said first developing means; and fourth means for adjusting the amplitude of said energy developed by said second developing means.

8. A beam convergence circuit for a multi-beam cathode-ray tube the beams of which are deflected in two scanning directions normal with respect to each other comprising: a first electron beam convergence winding; a second electron beam convergence winding; first means for developing in said first and second convergence windings current varying in magnitude as a first parabolic function of deflection angle during the entire deflection period corresponding to one of said directions; second means for developing in said first and second convergence windings current varying in magnitude as a second and different parabolic function of deflection angle also during the entire deflection period corresponding to one of said directions; first adjusting means for simultaneously and unidirectionally varying the current in said first and second convergence windings developed by said first developing means; second adjusting means for simultaneously and unidirectionally varying the current in said first and second convergence windings developed by said second developing means; third adjusting means for differentially varying the current in said first and second convergence windings developed by said first developing means; fourth adjusting means for differentially varying the current in said first and second convergence windings developed by said second developing means.

9. A beam convergence circuit for a multi-beam cathode-ray tube the beams of which are deflected in two scanning directions normal with respect to each other comprising: a first electron beam convergence winding; a second electron beam convergence winding; first means for developing in said first and second convergence windings current varying in magnitude as a first parabolic function of deflection angle during the entire deflection period corresponding to one of said directions; second means for developing in said first and second convergence windings current varying in magnitude as a second and different parabolic function of deflection angle also during the entire deflection period corresponding to one of said directions; first adjusting means for simultaneously and unidirectionally varying the current in said first and second convergence windings developed by said first developing means; second adjusting means for simultaneously and unidirectionally varying the current in said first and second convergence windings developed by said second developing means; third adjusting means for simultaneously and symmetrically inversely varying the current in said first and second convergence windings developed by said first developing means; fourth adjusting means for simultaneously and symmetrically inversely varying the current in said first and second convergence windings developed by said second developing means.

10. A beam convergence circuit for a multi-beam cathode-ray tube the beams of which are deflected in two scanning directions normal with respect to each other comprising: a first electron beam convergence winding; a second electron beam convergence winding; a first means for developing voltage having a waveform which comprises a substantially pulse-shaped portion and further comprises a substantially sawtooth-shaped portion; second means for developing voltage having a waveform which comprises a substantially pulse-shaped portion and further comprising a substantially sawtooth-shaped portion, said pulse-shaped portion of said second developing means occurring substantially coincidentally with said pulse-shaped portion of said first developing means, said pulse-shaped portions being oppositely polarized relative to their respective associated sawtooth-shaped portions; first adjusting means for adjusting the amplitude of said waveform developed by said first developing means; second adjusting means for adjusting the amplitude of said waveform developed by said second developing means; and means for coupling said first and second convergence windings to said first and second adjusting means.

11. A beam convergence circuit for a multi-beam cathode-ray tube the beams of which are deflected in two scanning directions normal with respect to each other comprising: a first electron beam convergence winding; a second electron beam convergence winding; a first means for developing voltage having a waveform which comprises a substantially pulse-shaped portion and further comprises a substantially sawtooth-shaped portion; second means for developing voltage having a waveform which comprises a substantially pulse-shaped portion and further comprises a substantially sawtooth-shaped portion, said pulse-shaped portion of said second developing means occurring substantially coincidentally with said pulse-shaped portion of said first developing means; first adjusting means for adjusting the amplitude of said waveform developed by said first developing means; second adjusting means for adjusting the amplitude of said waveform developed by said second developing means; means for coupling one end of said first and second convergence windings to said first adjusting means to develop within said windings a current varying in magnitude as a first parabolic function of deflection angle during the entire deflection period corresponding to one of said directions; and means for coupling the other end of said first and second convergence windings to said second adjusting means to develop within said windings a current varying in magnitude as a second and different parabolic function of deflection angle also during the entire deflection period corresponding to one of said directions.

12. A beam convergence circuit for a multi-beam cathode-ray tube the beams of which are deflected in two scanning directions normal with respect to each other comprising: a first electron beam convergence winding; a second electron beam convergence winding; first means for developing voltage having a waveform which comprises a substantially pulse-shaped portion and further comprises a substantially sawtooth-shaped portion; second means for developing voltage having a waveform which comprises a substantially pulse-shaped portion and further comprising a substantially sawtooth-shaped portion, said pulse-shaped portion of said second developing means occurring substantially coincidentally with said pulse-shaped portion of said first developing means; first adjusting means for coupling said first voltage developing means to one end of said first and second convergence windings to develop within said windings a first current varying in magnitude as a parabolic function of deflection angle during the entire deflection period corresponding to one of said directions whereby adjusting said first adjusting means simultaneously and unidirectionally varies the amount in said windings; second adjusting means for coupling said first voltage developing means to the other end of said first and second convergence windings to develop within said windings a second current varying in magnitude as a parabolic function of deflection angle also during the entire deflection period corresponding to one of said directions whereby adjusting said first adjusting means simultaneously and unidirectionally varies the current in said windings; third adjusting means for simultaneously and symmetrically inversely varying said first current in said first and second convergence windings; and fourth adjusting means for simultaneously and symmetrically inversely varying said second current in said first and second convergence windings.

References Cited in the file of this patent

UNITED STATES PATENTS

| | | |
|---|---|---|
| 2,743,389 | Giuffrida | Apr. 24, 1956 |
| 2,759,121 | Parker | Aug. 14, 1956 |
| 2,987,647 | Armstrong | June 6, 1961 |
| 3,114,858 | Schopp | Dec. 17, 1963 |

OTHER REFERENCES

Color Television Service Data, 1960, No. T5, For CTC 10 Chassis Series, RCA Victor, pages 32–33, May 10, 1960.